US006851820B2

(12) United States Patent
Choi et al.

(10) Patent No.: US 6,851,820 B2
(45) Date of Patent: Feb. 8, 2005

(54) BARBECUE GRILL LIGHT (75) Inventors: Daniel S. Choi, Mundelein, IL (US); Adrian A. Bruno, Rolling Meadows, IL (US)

(73) Assignee: Weber-Stephen Products Company, Palatine, IL (US)

( * ) Notice: Subject to any disclaimer, the term of this patent is extended or adjusted under 35 U.S.C. 154(b) by 29 days.

(21) Appl. No.: 10/180,958

(22) Filed: Jun. 26, 2002

(65) Prior Publication Data

US 2004/0001334 A1 Jan. 1, 2004

(51) Int. Cl.[7] .................................................. F21V 33/00
(52) U.S. Cl. ........................... 362/92; 362/94; 362/399; 362/802
(58) Field of Search .......................... 362/92, 94, 191, 362/208, 399, 802; 126/41 R, 213

(56) References Cited

U.S. PATENT DOCUMENTS

| | | |
|---|---|---|
| 1,203,576 A | 11/1916 | Broadhead |
| 1,523,495 A | 1/1925 | Silberman |
| 2,114,542 A | 4/1938 | Rydquist |
| 2,151,182 A | 3/1939 | Birdsall |
| RE21,512 E | 7/1940 | Creamer |
| 2,242,981 A | 5/1941 | Pedersen |
| 2,308,844 A | 1/1943 | Wilshusen |
| 2,310,593 A | 2/1943 | Orlicki |
| 2,479,500 A | 8/1949 | Longberg |
| 2,591,571 A | 4/1952 | Marino |
| D216,458 S | 1/1970 | Nestrock |
| 3,569,689 A | 3/1971 | Nestrock |
| 3,707,016 A | 12/1972 | Smoot |
| 4,149,331 A | 4/1979 | Prager |
| 4,231,077 A | 10/1980 | Joyce et al. |
| 4,274,131 A | 6/1981 | Praamsma |
| 4,356,592 A | 11/1982 | Moore |
| 4,394,718 A | 7/1983 | Balzer |
| 4,413,311 A | 11/1983 | Orenstein |
| 4,754,376 A | 6/1988 | Winslow |
| 4,924,357 A | 5/1990 | Yamashita et al. |
| 5,020,256 A | 6/1991 | French |
| 5,025,352 A | 6/1991 | Brown |
| 5,148,356 A | 9/1992 | Freese et al. |
| 5,165,643 A | 11/1992 | Shreiner |
| 5,193,786 A | 3/1993 | Guenther |
| 5,257,169 A | 10/1993 | Walendziak |

(List continued on next page.)

FOREIGN PATENT DOCUMENTS

| | | |
|---|---|---|
| DE | 3144034 A1 | 5/1983 |
| EP | 0 515 921 A2 | 12/1992 |
| GB | 1 445 843 | 8/1976 |
| GB | 2143029 A | 1/1985 |
| JP | 6-94922 | 4/1994 |
| JP | 11-208277 | 8/1999 |
| WO | WO 98/06975 | 2/1998 |

OTHER PUBLICATIONS

"Introducing IllumaGrip," ITC Incorporated Marine and RV Acessories, p. 1.

Primary Examiner—Thomas M. Sember
Assistant Examiner—Jacob Y. Choi
(74) Attorney, Agent, or Firm—Wallenstein Wagner & Rockey, Ltd.

(57) ABSTRACT

A light for a barbecue grill is provided. The light has a housing mounted to the lid of a barbecue grill, and the housing contains a light source, a power source, a controller and a switch. The switch may be a manual switch or an automatic tilt switch. The switches manipulate illumination of the light sources when the lid of the barbecue grill is opened.

30 Claims, 4 Drawing Sheets

U.S. PATENT DOCUMENTS

| | | | |
|---|---|---|---|
| 5,297,010 A | | 3/1994 | Camarota et al. |
| 5,339,228 A | | 8/1994 | Baethge et al. |
| 5,396,740 A | | 3/1995 | Bocchi |
| 5,437,066 A | * | 8/1995 | Mills et al. .................... 4/664 |
| 5,440,783 A | | 8/1995 | Allardyce et al. |
| 5,641,220 A | | 6/1997 | Sutherland et al. |
| 5,664,867 A | * | 9/1997 | Martin et al. ............... 362/101 |
| 5,664,875 A | | 9/1997 | Hegedus |
| 5,692,822 A | | 12/1997 | Dreyer |
| 5,771,537 A | | 6/1998 | Ho |
| 5,779,228 A | | 7/1998 | Hansen |
| 5,913,671 A | | 6/1999 | Fernandez et al. |
| 5,957,566 A | | 9/1999 | Chiu |
| 6,058,230 A | | 5/2000 | Ward |
| 6,065,852 A | | 5/2000 | Crumley |
| 6,073,623 A | | 6/2000 | Maschhoff |
| 6,079,843 A | | 6/2000 | Latella et al. |
| 6,132,055 A | | 10/2000 | Grisamore et al. |
| 6,135,621 A | | 10/2000 | Bach et al. |
| 6,139,174 A | | 10/2000 | Butterworth |
| 6,164,805 A | | 12/2000 | Hulse |
| 6,202,640 B1 | | 3/2001 | Naperola et al. |
| 6,209,933 B1 | | 4/2001 | Ang et al. |
| 6,267,492 B1 | | 7/2001 | Reid et al. |
| 6,290,040 B1 | | 9/2001 | Chen |
| 6,488,397 B1 | | 12/2002 | Masutani et al. |
| 2001/0033484 A1 | | 10/2001 | Gilley |
| 2001/0055207 A1 | | 12/2001 | Barbeau et al. |
| 2003/0111070 A1 | | 6/2003 | DeMars |

* cited by examiner

BARBECUE GRILL LIGHT

TECHNICAL FIELD

The present invention relates generally to field of lighting, and more specifically to a lighting apparatus for barbecue grills.

BACKGROUND OF THE INVENTION

Barbecue grills are often utilized in low lighting environments. However, in low lighting environments it is often difficult to adequately view the cooking surface of the grill and the food being cooked thereon. Therefore, various types of lights have been provided to illuminate the cooking surface of barbecue grills. Such illumination devices are generally grouped into one of two categories: (1) auxiliary lights removably fastened to the grill structure; and, (2) various lights integral with components of the grill structure. However, the current state of prior devices for each of these types of lights have inherent drawbacks.

1. Auxiliary Lights Removably Fastened to the Grill Structure

U.S. Pat. No. 6,202,640 discloses a grill lighting apparatus comprising a hollow conduit adapted to be mounted to a hollow frame member of a gas grill. A first end of the conduit may be mounted in a sliding-fit relationship within the frame member of the grill. The conduit extends upwardly and includes a second end positioned over the cooking grate of the grill. An illumination assembly is pivotally mounted to the second end of the conduit. Further, a flexible tube extends through the interior space of the conduit and is adapted to carry a combustible fuel, such as propane, from the fuel tank of the grill to the illumination assembly. The illumination assembly includes a mantle which is effective to provide a light when the fuel delivered thereto is ignited under controlled conditions. Having a flame exposed over the cooking area, and in the area of the user, however, may not be desirable.

U.S. Pat. No. 5,664,875 discloses a barbecue grill light comprising a housing, and a structure for mounting the housing to a side platform of a barbecue grill. An elongated flexible gooseneck shaft is connected to the housing at one end, and an assembly for illuminating the cooking area is affixed to an upper end of the elongated flexible gooseneck shaft. Such a device, however, requires a side platform on the barbecue grill. Further, if the light is positioned over the cooking surface it may become obtrusive to the user when attempting to close the lid of the barbecue grill.

2. Lights Integral with Components of the Grill Structure

U.S. Pat. No. 5,257,169 discloses a barbecue grill lighting apparatus. The lighting apparatus of the '169 patent contains a cylindrical housing with a bulb located in the housing. The housing is arranged for fixed securement to the upper barbecue grill housing with a pair of flanged wall plates. The housing is positioned adjacent and below the handle of the upper barbecue grill housing. Further, the housing of this lighting apparatus includes a crank handle connected to a generator. When the crank handle is turned the generator, which is in operative communication with rechargeable batteries, effects selective illumination of the bulb in the housing. Since this device is directly below the handle, it may become obtrusive to the user when opening and closing the grill lid. Further, the generator crank is complicated for the user to operate.

U.S. Pat. No. 6,073,623 discloses a retractable grill light mounted to an upper portion of the front of the lower grill housing and moveable between a first operable position and a second stored position. In the operable position the light is oriented to illuminate the cooking surface of the grill. In the stored position, the top surface of the light is substantially aligned with the cooking surface and the top surface of an auxiliary shelf attached to the grill. This lighting device, however, may not provide adequate lighting to foods placed on the rear of the cooking grate. Further, when the light is mounted in the operable position it is above the front of the cooking grate and may interfere with the user's ability to manipulate the food on the cooking grate.

U.S. Pat. No. 6,079,843 discloses a lighting apparatus protruding from the grill housing adjacent a rear of the grill. The lighting apparatus includes a lighting enclosure having a mounting bracket secured within the grill pit of the grill housing and extending outwardly therefrom, and a substantially transparent front closure means for sufficient sealing a front of the lighting enclosure. A lighting means is positioned within the lighting enclosure for illuminating the grilling surface through the substantially transparent front closure means. Such an apparatus, however, is large and reduces the surface area of the cooking grid.

U.S. Pat. No. 6,132,055 discloses a handle assembly mounted to a barbecue grill lid. The handle assembly includes an integral light positioned to shine upon the cooking surface of the barbecue grill when the barbecue lid is open. The integral barbecue handle/light assembly is preferably mounted by removal of the conventional handle from the barbecue grill lid, and attaching the integral barbecue handle/light and mounting hardware in place of the conventional handle. The integral handle/light is shaped as a light-containing tube having a clear outer housing, and an inner housing or mounting cradle. The inner housing is semi-circular in cross-sectional shape and runs substantially the length of the outer tube. Such a device is difficult to assemble because it requires disassembly of the conventional grill handle prior to the assembly of the grill light. Further, such a device is expensive.

Accordingly, a simple and inexpensive lighting apparatus for barbecue grills in accordance with the present invention provides an apparatus which eliminates the drawbacks of prior illumination devices.

SUMMARY OF THE INVENTION

The present invention provides a light for a barbecue grill. The present assembly is relatively inexpensive and is easy to manufacture, assemble and connect to the barbecue grill. Further, while the present assembly can be provided on new barbecue grills, it also can be utilized as a retrofit assembly on existing barbecue grills.

According to one feature of the present invention, the light assembly generally comprises a housing and an illumination device. In one embodiment the light comprises a housing having an illumination device operably connected to the upper member of the barbecue grill.

According to another aspect of the present invention, the light for the barbecue grill generally comprises a light housing having a light source and a switch. The light housing may be mounted to a handle on the lid or upper member of the barbecue grill. The light housing may be directly mounted to the handle or upper member, or an additional component may be utilized to mount the light to the handle or upper member. Further, the switch is on the light housing for controlling illumination of the light source.

According to another aspect of the present invention, the light housing has a first housing member and a second housing member. In this aspect of the invention the light housing may have a parting line dividing the housing into the first and second members. In one embodiment, the first housing member has a light source, and the second housing member is connected to the first housing member. Often, the connection of the second housing member and the first housing member secures the light housing to the barbecue grill. In another embodiment, the first housing member and the second housing member are connected in a clamping engagement to secure the light housing to the handle of the barbecue grill. In such an embodiment, the first member may engage the second member around a portion of the handle of the barbecue grill to provide the securement of the light to the barbecue grill.

According to another aspect of the present invention, the light has a first illumination member having a first light source and a second illumination member having a second light source depending from the light housing. In one embodiment the first and second illumination members of the light are separated on the light housing by a handle portion of the light housing. Further, the first and second illumination members may depend from the first housing member.

According to another aspect of the present invention, the light housing is positional connected to the upper member of the barbecue grill such that the illumination device is angled toward the cooking grid in the cooking chamber when the upper member of the barbecue grill is in an open position.

According to another aspect of the present invention, the light has a toggle switch on the light's housing. The toggle switch manipulates illumination of the illumination device. In one embodiment the toggle switch moves between an open position and a closed position based on the position of the housing connected to the upper member of the barbecue grill.

According to another aspect of the present invention, the toggle switch is an angle dependent tilt sensor that senses the angle of the light housing as the upper member of the barbecue grill is opened and closed. As the housing moves past a specific differential angle, the tilt sensor advances to an open position.

According to another aspect of the present invention, the light has a manual switch on the light housing. The manual switch is electrically connected to the toggle switch and the light source. The manual switch provides an override to the toggle switch for manipulating illumination of the illumination device. In one embodiment, the manual switch is on a first of the two pods of the light housing. Further, the switch is electrically connected to a circuit board in the light housing.

According to another aspect of the present invention, the light for the barbecue grill further includes a power source in electrical communication with the light source and the switch. In one embodiment the power source comprises a plurality of batteries. Moreover, at least one battery is typically located in a battery compartment in the first pod to provide a power source for the light source in the first pod, and at least one battery is located in a battery compartment in the second pod to provide a power source for the light source in the second pod. A battery cover to close each battery compartment is provided for each of the first and second pods.

According to another aspect of the present invention, the light housing has a first pod having a light source, and a second pod having a light source. The second pod is distal the first light source, and the second pod being separated from the first pod from a handle portion of the light housing.

According to yet another aspect of the present invention, a method of operating the light for the barbecue grill is provided. The method comprises the steps of providing a light having a housing, a light source, a power source and a tilt switch in the housing, the housing being mounted to the lid of the barbecue grill; lifting the lid of the barbecue grill to open the lid; having the tilt switch sense the opening of the lid; and, receiving a signal from the tilt switch that the lid is being opened and providing power to the light source to illuminate the light source.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENT

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
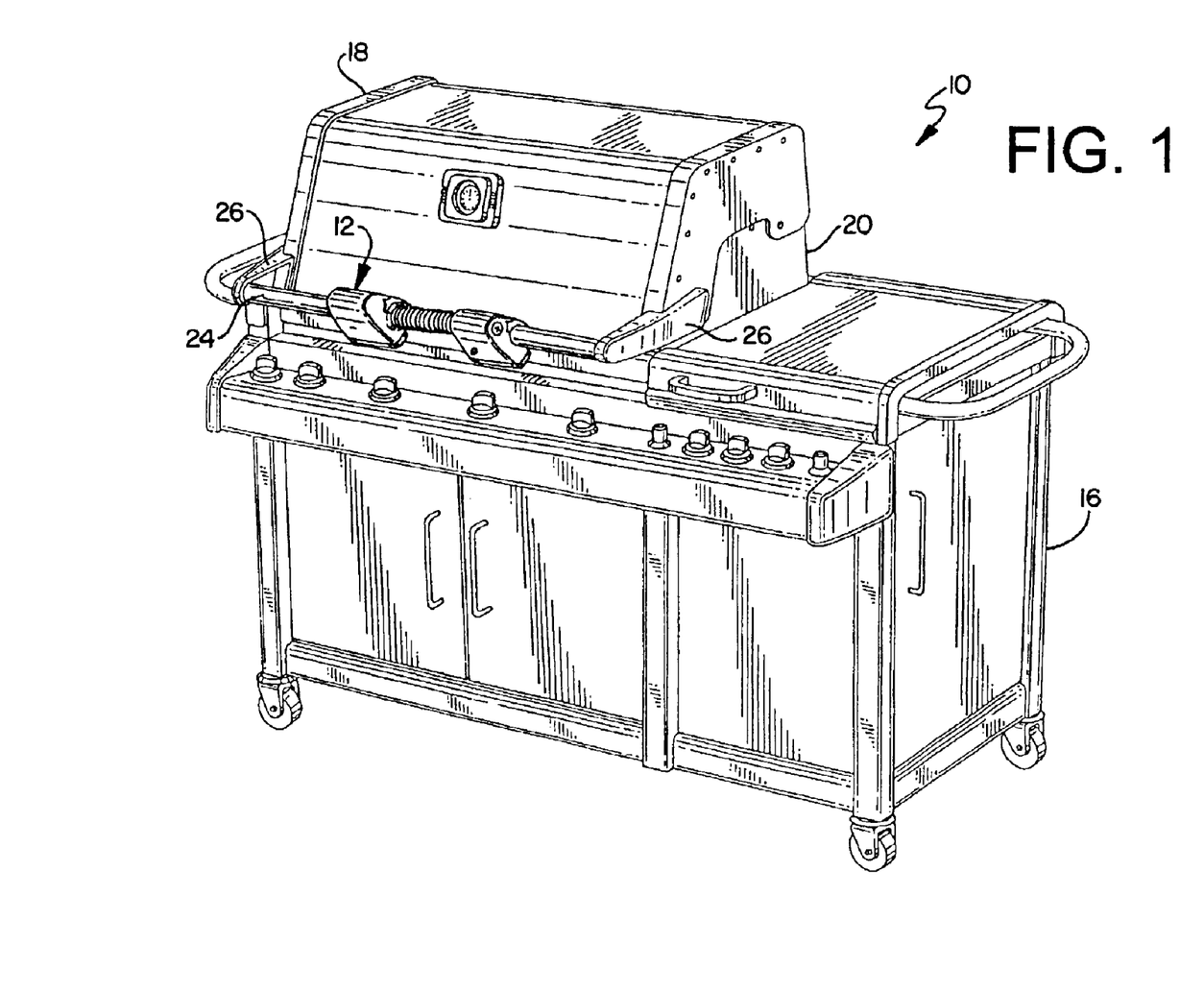
FIG. 1 is a perspective view of the light of the present invention as shown on a barbecue grill.
Figures 2, 3:
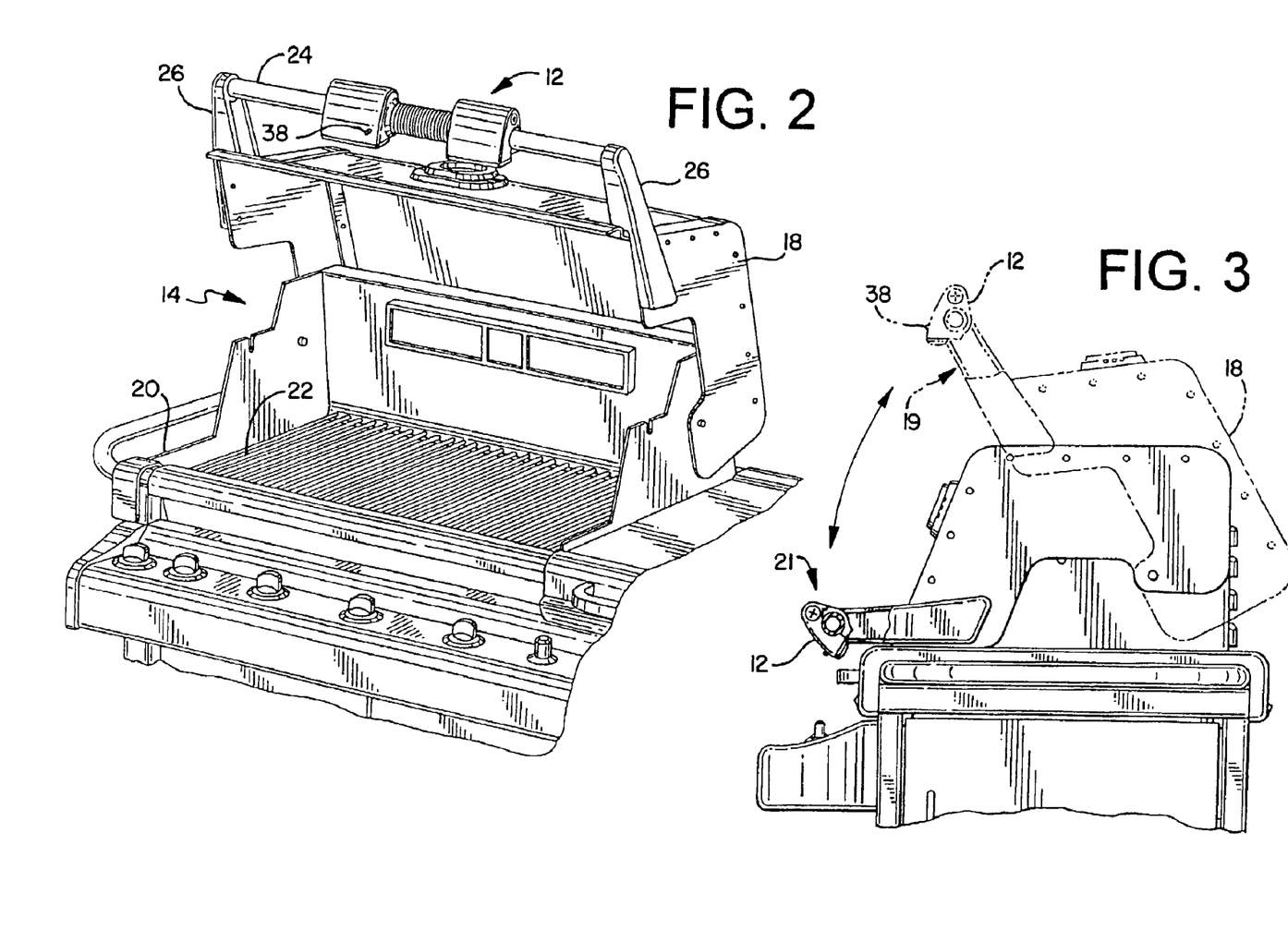
FIG. 2 is a perspective view of the light of FIG. 1, as shown in an illumination position.
FIG. 3 is an elevational side view of the light of FIGS. 1 and 2.

Referring now in detail to the figures, and initially to FIG. 1, there is shown a barbecue grill, generally designated by reference numeral 10, having a light 12 that is constructed in accordance with the teachings of the present invention. The barbecue grill 10 generally comprises a cooking vessel 14 secured to a portable cart 16, however, any grill support structure 16, including a stationary support structure may be utilized. The cooking vessel 14 comprises an upper member 18 and a lower member 20. The lower member 18 defines a cooking chamber having a cooking grid 22. The cooking grid 22 is situated on the lower member 20 and supports the food to be cooked. The upper member or cover 18 is secured to the grill 10 by a hinge. In the closed position, as shown in FIG. 1, the upper member 18 covers the lower member 20. In an open position, as shown in FIG. 2, the upper member 18 is raised so that the cooking chamber, and specifically the food on the cooking grid 22, may be exposed. As is understood by those of skill in the art, the upper member 18 need not be hingedly supported to the grill 10; the upper member 18 may be removable from the grill 10. Further, it is understood that the upper member 18 is in the open position in substantially any position other than the closed position. A handle 24 extends from the upper member 18 to allow the user to lift and/or remove the upper member 18 from the barbecue grill 10. Typically, the handle 24 is connected to the upper member 18 with end supports 26.

Figure 4:
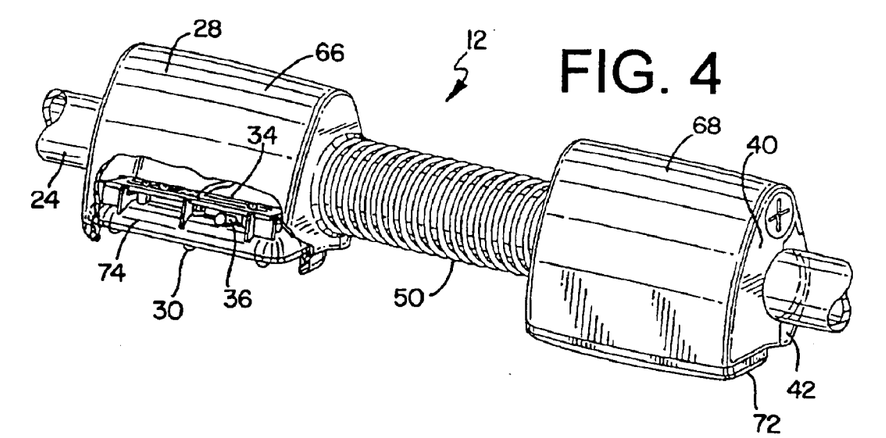
FIG. 4 is a perspective view of the light of the present invention.
Figure 7:
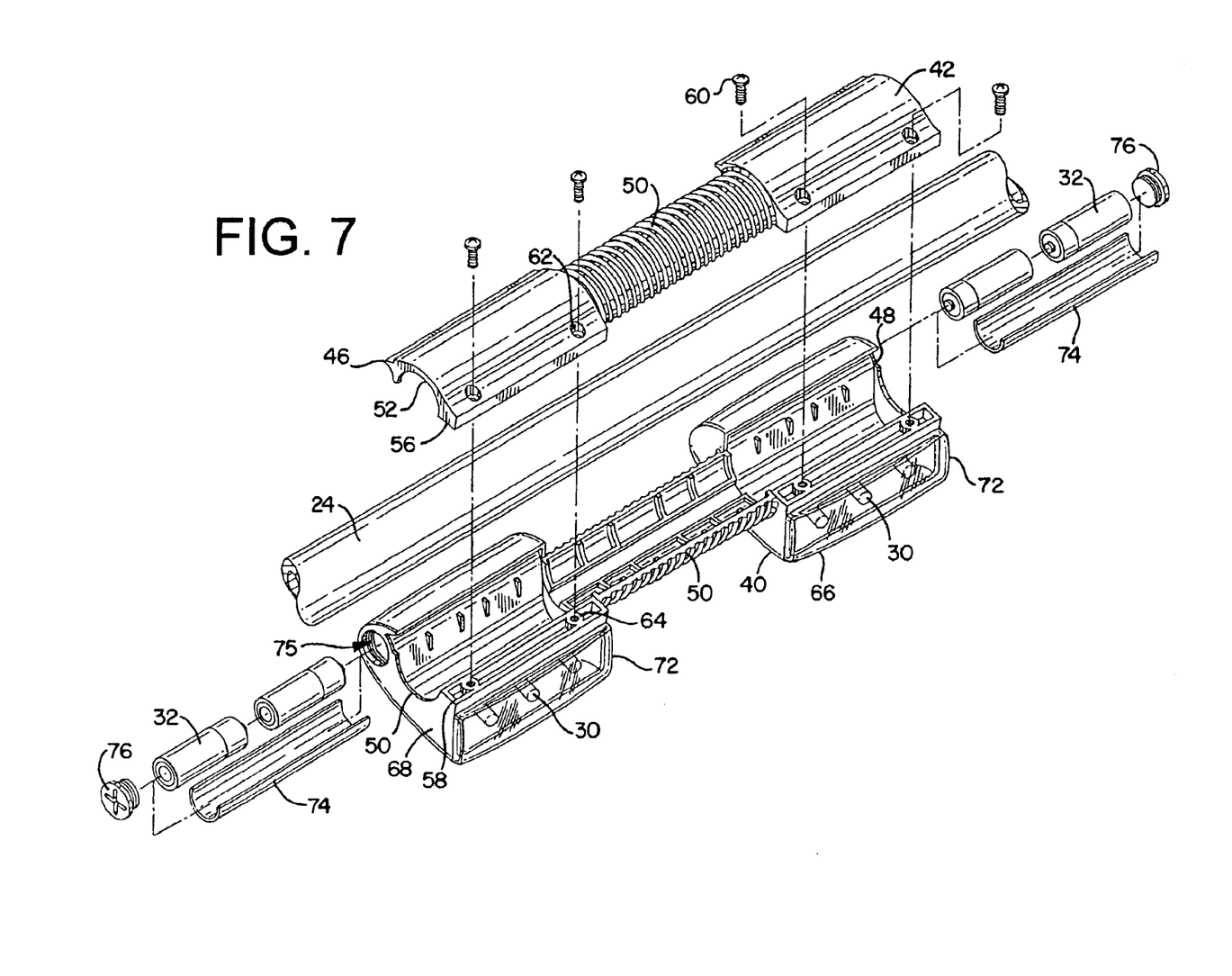
FIG. 7 is an exploded view of the light of the present invention.

The light assembly 12 of the present invention is shown apart from the grill 10 in FIGS. 4 and 7. The light assembly 12 generally has a light housing 28, an illumination device or light source 30, a power source 32, a controller 34, a tilt switch 36, and an on/off switch 38. Typically, the light 12 is operably connected to the upper member 18 of the barbecue grill 10. As shown in FIGS. 1–3, in one embodiment the light 12 is connected to the handle 24 of the barbecue grill 10. In another embodiment, the light 12 is mounted directly to the handle 24 of the barbecue grill 10.

Figure 6:
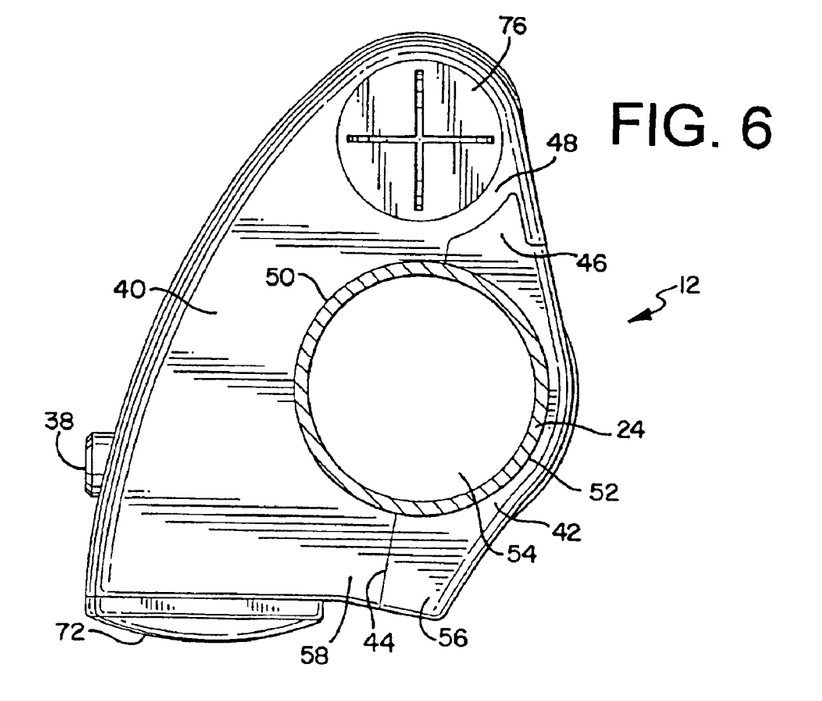
FIG. 6 is a side view of the light of the present invention.

As best shown in FIGS. 6 and 7, in one embodiment the light housing 28 comprises a first housing member 40 and a second housing member 42. The second housing member 42 may provide qualities of a bracket member. The parting line 44 between the first and second housing members 40, 42 is best shown in the side view of FIG. 6. The first housing member 40 houses the light source 30, the power source 32, the controller 34, the tilt sensor 36 and the on/off switch 38. The second housing member 42 generally operates as a securing or clamping member to be connected to the first housing member 40. In a preferred embodiment, the light 12 is secured to the barbecue grill 10 by clampingly engaging the second housing member 42 to the first housing member 40 around a portion of the handle 24 of the grill 10. Further, in a preferred embodiment the light 12 is connected to the grill 10 such that the illumination provided by the light source 30 is directed at the cooking grid 22 at substantially every angle of opening of the upper member 18 of the barbecue grill 10.

One means by which the light 12 may be secured to the barbecue grill 10 is disclosed in FIGS. 6 and 7. As shown, the first and second housing members 40, 42 attach to one another around the handle 24 of the barbecue grill 10, thus fixedly securing the light 12 to the grill 10. Such may be accomplished with a pressure fit. Often, the handle 24 of the barbecue grill 10 has a circular cross-sectional geometry. As such, the engaging surfaces 50, 52 of the first and second housing members 40, 42, respectively, each have a semi-circular geometry for mating with the handle 24. In the joined configuration as shown in FIG. 6, the engaging surfaces 50, 52 of the light housing 28 form an aperture 54 through the light housing 28. In a preferred embodiment, the aperture 54 through the light housing 28 has a diameter that allows it to provide a pressure fit with the handle 24. As an addition, at least one of the first and second housing members 40, 42 may have a securing member (not shown) which is displaced between at least one of the engaging surfaces 50, 52 of the aperture 54 and the outer surface of the grill handle 24 for assisting in fixedly securing the light housing 28 on the handle 24 and for preventing rotation or other movement of the light housing 28 on the handle 24. The securing member may be connected to one of the engaging surfaces 50, 52. The securing member may be a foam insert, a gasket, a rubber or plastic member, a softer metal, or any other material which provides the desired effect. Further, while a circular geometry has been disclosed for the handle and the aperture through the light housing, it is understood that any acceptable geometrical combination for either the handle, the aperture, or both, may be utilized.

In a preferred embodiment, the second housing member 42 has a first end 46 which engages a first mating portion 48 of the first housing member 40 to seat the second housing member 42 on the first housing member 40. More specifically, the first end 46 of the second housing member 42 is configured to provide a protrusion, and the first mating portion 48 of the first housing member 40 has a lip which engages the protrusion. The protrusion and lip engage one another to properly seat the first end 46 of the second housing member 42 on the first housing member 40, however, any mating engagement will be operable. When the first end 46 of the second housing member 42 is properly seated in the first mating portion 48 of the first housing member 40, the second housing member 42 can be rotated such that the second end 56 of the second housing member 42 engages a second mating portion 58 of the first housing member 40. Finally, securing devices, such as bolts 60, are inserted through holes 62 in the second housing member 42 and mate with receivers 64 in the first housing member 40 to fixedly secure the second housing member 42 to the first housing member 40 around the handle 24 of the barbecue grill 10.

As shown in FIGS. 2–3, the light 12 is positionally connected to the barbecue grill 10 such that the light source 30 is angled toward the cooking grid 22 when the upper member 18 of the barbecue grill 12 is in the open position 19. Further, when the upper member 18 of the barbecue grill 12 is in the open position 19 the manual switch 38 is directed toward the operator for accessible use thereof. Finally, because the light 12 is fixed in place to the handle 24 of the grill 10, when the upper member 18 is in the closed position 21, as shown in FIGS. 1 and 3, the light source 30 is directed inwardly.

In another embodiment, the second housing member 42 is not utilized. Instead, the first housing member 40 of the light housing 28 is connected or mounted directly to the handle 24 of the barbecue grill 10, as opposed to a clamping engagement or other means in combination with the second housing member 42. In a preferred embodiment, the first housing member 40 has an engaging surface that engages a mounting surface on the handle 24 of the barbecue grill 10. Typically, the mounting surface is an exterior surface of the handle 24. This may be accomplished with the use of screws, heat resistant adhesive, clamps, or any other mounting means allowable. Because the light assembly 12 is essentially self-contained, the light assembly 12 may be incorporated on substantially any grill. Further, the light assembly 12 may be provided on new barbecue grills, and it may also be utilized as a retrofit assembly for existing barbecue grills.

As shown in FIGS. 4–7, the light 12 includes two illumination or light members 66, 68 also referred to as first and second pods 66, 68. The illumination members 66, 68 are separated by a handle portion 50 of the light housing 28 between the two illumination members 66, 68. The handle portion 50 may have a series of ribs to provide a better grip for raising and lowering the upper member 18 of the barbecue grill 10. In a preferred embodiment, the handle portion 50 of the light 12 has a generally circular cross-sectional geometry. Further, as shown in the figures, in the preferred embodiments the pods 66, 68 protrude distal the handle portion 50 of the light 12. Also, the pods may have a configuration which allows rain to drip off the light 12 rather than pooling thereon.

In a preferred embodiment, each of the light pods 66, 68 contains a light source 30, a power source 32 and a controller 34. Further, one of the pods 66 contains a tilt sensor 36 which senses the displacement of the light 12 to determine whether the light 12 is in the on position or the off position. Additionally, one of the pods 66 (often the same pod as that which has the tilt sensor) has a manual switch 38 which provides an override to the tilt sensor 36. Since only one tilt sensor 36 and on/off switch 38 is typically utilized, these components are in electrical connection with all of the controllers 34. While two pods are provided in the preferred embodiment, more or less than two pods may be utilized without departing from the scope of the present invention.

In this embodiment, the light source 30 includes three light emitting diodes (LED) located in each pod, and shining outwardly. A reflector 70 is placed within each pod and adjacent the light source 30 to direct the light out of the light housing 28. Further, a cover 72 is placed over the lights 30 to protect the lights from smoke and other debris. The cover 72 is a transparent plastic that can easily be wiped clean.

Figure 5:
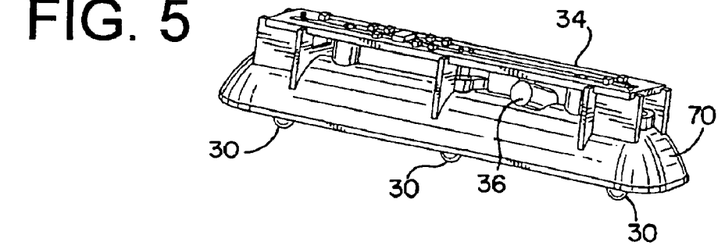
FIG. 5 is a partial perspective view of the internal components of the light of the present invention.

As shown in FIGS. 5 and 7, the power source 32 includes a pair of batteries which are provided in series in a battery tray 74 and placed within a battery compartment 75 to provide electrical connection of the power source to the light sources 30. In a preferred embodiment, each of the battery trays 74 within the respective battery compartments 75 are also provided in series to provide approximately 6 volts to the LED light sources 30. As explained above, in a preferred embodiment, each pod has its own power source 32 which is provided in series, however, a single power source may be provided for all of the pods. The batteries 32 and battery tray 74 are placed in the compartment 75 within the light housing 28 through an opening in the light housing 28. Once the battery tray 74 is in place, a sealed cap 76 is utilized to provide a sealed closure for the power source cavity. The power source 32 is in electrical communication with the light source 30, the controller 34 and the switches 36, 38.

The controller 34 of the light assembly 12 includes a circuit board which controls operation of the light 12. In the preferred embodiment, there are circuit boards in each pod, and each of the circuit boards 34 are printed circuit boards which are electrically connected to the power sources 32 located in that pod. Further, in the preferred embodiment, the circuit board 34 in each pod is also electrically connected to the light sources 30. Finally, each of the controllers 34 in the pods 66, 68 are also electrically connected to the tilt sensor 36 or automatic toggle switch 36 and the on/off switch 38. In the preferred embodiment only one tilt sensor 36 and on/off switch 38 are utilized, however, additional sensors and switches may be incorporated into the light 12. In this embodiment, both the tilt sensor 36 and the on/off switch 38 are located in the first pod 66.

In the preferred embodiment, the tilt sensor 36 is a device that uses a moving, conductive mechanical material, such as a conductive sphere, within a nickel-tin plated housing to provide an angle dependent switch. The tilt sensor 36 is moveable between an open position and a closed position based on the angular position of the light housing 28 connected to the upper member 18 of the grill 10 as the upper member 18 of the grill is opened and closed. As such, when the tilt sensor 36 is in one of the open position or the closed position the tilt sensor 36 provides to have the light source 30 off, and wherein when the tilt sensor 36 is in the other of the one of the open position or the closed position the tilt sensor 36 provides to have the light source 30 illuminated. Such is accomplished by a change in the differential angle of the tilt sensor 36. It is understood that the open position does not require the lid of the grill 12 to be completely extended. When the device is at a differential angle, for example such as greater than 10 degrees, and preferably approximately 15 degrees, the switch is in the closed position and is capable of switching up to a 60 VAC voltage and a 250 mA current. While a 10 degree and 15 degree angle of opening are identified as examples, the tilt sensor 36 is capable of sensing lesser or greater differential angles for illuminating the light source 30. The maximum contact resistance in the closed position is 30 ohms. In the open position, the switch resistance is greater than 1 Mohm. In the preferred embodiment, the tilt sensor 36 is Comus tilt sensor, model CW 1300-0. It is understood that the open and closed positions of the tilt sensor 36 may be reversed without departing from the scope of the present invention. It is further understood that while a tilt sensor is disclosed, such is defined as any sensor which is capable of determining whether lid of the barbecue grill is in the closed position and whether it is not in the closed position. Further, in the preferred embodiment, the on/off switch 38 is a depressable button which provides an override generally for the light assembly 12, and more specifically for the toggle switch 36. Regardless of whether a controller 34 is utilized or not, both of the switches 36, 38 ultimately control or manipulate illumination of the light sources 30.

The light 12 may also have a light sensor (not shown) incorporated therein and electrically connected to the controller 34. The light sensor would provide an override such that even if the light were in the on mode, and even if the tilt-sensor sensed that the upper member 18 was in an open position, the light would remain off until the light sensor determined that it was sufficiently dark enough to warrant illumination of the light. Another feature of the light 12 includes a timer (not shown). The timer may operate in conjunction with any of the electrical components of the light 12 to turn the light sources 30 off after a certain period of time following the upper member 18 being placed in an open position. Each of these features are provided as power saving means.

Typically, the method of use of the light 12 is such that if the manual switch 38 has been engaged at any time to place the light in the on mode, the light sources 30 of the light 12 will be illuminated when the tilt sensor 36 determines that the upper member 18 is in an open position. At such time the cooking grid 22 will be adequately illuminated for the grill operator. If at any time the manual switch 38 is engaged to place the light in the off mode, this operation will override a signal by the tilt switch 36 to illuminate the light sources 30. As such, the light 12 will remain in the off mode, even when the upper member 18 is opened, until the manual switch 38 is engaged to place the light in the on mode. Accordingly, the light 12 will only operate when the light 12 is in the on mode (as set by the manual switch 38), and the upper member 18 is in an open position. If, however, the light is left to remain in the on mode, opening and closing of the upper member 18 will allow the tilt switch 36 to be the sole control of illumination of the light sources 30. As is fully understood by one of ordinary skill in the art, such a procedure may be modified by incorporating fewer or more electrically controlling components on the light.

While the specific embodiments have been illustrated and described, numerous modifications come to mind without significantly departing from the spirit of the invention, and the scope of protection is only limited by the scope of the accompanying Claims.

We claim:

1. A light for a barbecue grill, the barbecue grill having an upper member and a lower member defining a cooking chamber having a cooking grid, the upper member covering the lower member in a closed position, the light comprising:

a light housing mounted to the upper member of the barbecue grill, the housing having an illumination device;

an automatic switch connected to the light, the automatic switch manipulating illumination of the illumination device; and;

a manual switch on the light housing and electrically connected to the automatic switch, the manual switch providing an override to the automatic switch for manipulating illumination of the illumination device.

2. The light of claim 1, wherein the automatic switch moves between an open position and a closed position based on the position of the housing connected to the upper member of the barbecue grill.

3. The light of claim 1, wherein the automatic switch comprises an angle dependent tilt sensor that senses the angle of the light housing as the upper member of the barbecue grill is opened and closed.

4. The light of claim 3, wherein the tilt sensor advances to a closed position as the housing moves to a differential angle of greater than 10 degrees.

5. The light of claim 1, wherein the housing is connected to a handle extending from the upper member of the barbecue grill.

6. The light of claim 1, further comprising a first light member and a second light member depending from the light housing, and a handle portion of the light housing between the first and second light members.

7. The light of claim 1, wherein the light housing is positional connected to the upper member of the barbecue grill such that the illumination device is angled toward the cooking grid in the cooking chamber when the upper member of the barbecue grill is in an open position.

8. The light of claim 1, wherein the housing has a parting line, the parting line dividing the housing into a first member and a second member.

9. The light of claim 1, wherein the light housing is mounted directly to the handle of the barbecue grill.

10. The light of claim 6, wherein the light housing is mounted directly to the handle of the barbecue grill.

11. A light for a barbecue grill, the barbecue grill having an upper member and a lower member defining a cooking chamber having a cooking grid, the upper member covering the lower member in a closed position and a handle extending from the upper member, the light comprising:
a light housing having a first housing member and a second housing member, the first housing member having a light source, wherein the second housing member is connected to the first housing member, and wherein a portion of one of the handle or the upper member is positioned between the first housing member and the second housing member after the second housing member is connected to the first housing member.

12. The light of claim 11, wherein the first housing member and the second housing member are connected in a clamping engagement to secure the light housing to the handle of the barbecue grill.

13. The light of claim 12, wherein the first member engages the second member around a portion of the handle of the barbecue grill.

14. The light of claim 13, wherein a first end of the second housing member engages a mating portion of the first housing member to seat the second housing member on the first housing member, wherein a second end of the second housing member engages a different portion of the first housing member, a portion of the handle of the barbecue grill positioned between the first housing member and the second housing member, and wherein the second housing member is secured to the first housing member to clamp the light housing on the handle of the barbecue grill.

15. The light of claim 11, wherein the first housing member has a first illumination member having a first light source, and where in the first housing member has a second illumination member having a second light source, the first illumination member and the second illumination members being separated by a handle portion of the light housing.

16. A light for a barbecue grill, the barbecue grill having a lower housing with a cooking grid, and a lid that covers the lower housing when the lid is in a closed position, the light comprising:
a light housing having a light source, the light housing mounted to the lid of the barbecue grill, an automatic switch connected to the light source, the automatic switch manipulating illumination of the light source, and a manual switch on the light housing providing an override to the automatic switch for controlling illumination of the light source.

17. The light of claim 16, further comprising a power source in electrical communication with the light source and the switch.

18. The light of claim 17, wherein the power source comprises a plurality of batteries.

19. The light of claim 16, wherein the light housing has a first pod having a light source, and a second pod having a light source, the second pod being distal the first pod, and the second pod being separated from the first pod from a handle portion of the light housing.

20. The light of claim 19, wherein the switch is on the first pod of the light source.

21. The light of claim 19, wherein a portion of the first and second pods protrudes distal the handle portion of the light housing.

22. The light of claim 19, wherein at least one battery is located in a battery compartment in the first pod to provide a power source for the light source in the first pod, and wherein at least one battery is located in a battery compartment in the second pod to provide a power source for the light source in the second pod, and further comprising a battery cover to close each battery compartment in the first and second pods.

23. The light of claim 16, wherein the light housing comprises a first housing member and a bracket member, the first housing member containing the light source and the switch, wherein the bracket member is connected to the first housing member to secure the light housing to the handle of the barbecue grill.

24. The light of claim 23, wherein the first housing member and the bracket member are connected in a clamping engagement around a portion of the handle of the barbecue grill.

25. The light of claim 16, wherein the light housing is mounted to the handle of the barbecue grill.

26. The light of claim 16, wherein the light housing is screwed to the handle of the barbecue grill.

27. The light of claim 16, wherein the automatic switch is a tilt sensor electrically connected to the light source, the tilt sensor moving between an open position and a closed position based on movement of the light housing connected to the handle of the grill lid, wherein when the tilt sensor is in one of the open position or the closed position the tilt sensor provides to have the light source off, and wherein when the tilt sensor is in the other of the one of the open position or the closed position the tilt sensor provides to have the light source illuminated.

28. The light of claim 27, wherein the tilt sensor is an angle dependent sensor that senses the angle of the light housing as the lid of the barbecue grill is opened and closed.

29. The light of claim 27, wherein the light housing is mounted to the handle of the barbecue grill.

30. The light of claim 16, wherein the light housing has an aperture therethrough that is adapted to receive the handle of the barbecue grill.

* * * * *